United States Patent [19]

Garrigan et al.

[11] 4,052,494
[45] Oct. 4, 1977

[54] TRANSPARENCY FABRICATION METHOD

[75] Inventors: Peter P. Garrigan, Culver City; Alfred A. Gordon, Torrance; Walter W. Watson, Rancho Palos Verdes, all of Calif.

[73] Assignee: Northrop Corporation, Los Angeles, Calif.

[21] Appl. No.: 632,695

[22] Filed: Nov. 17, 1975

[51] Int. Cl.² .......................... B29C 9/00; D06P 3/00
[52] U.S. Cl. .............................................. 264/78; 8/4; 8/14; 8/147; 8/148; 8/158; 8/159; 35/42.5; 118/55; 118/56; 118/409; 264/1; 264/89; 264/92; 353/62; 427/231; 427/232; 427/240; 427/346
[58] Field of Search ............... 427/231, 232, 240, 346, 427/164, 162, 163; 428/174, 500, 35; 264/89, 93, 132, 134, 1, 92, 78; 8/4, 14, 147, 148, 158, 159; 118/55, 56, 409; 35/42.5; 353/62

[56] References Cited

U.S. PATENT DOCUMENTS

| | | | |
|---|---|---|---|
| 2,365,637 | 12/1944 | Helwig | 264/92 |
| 2,367,642 | 6/1945 | Helwig | 264/92 |
| 2,524,811 | 10/1950 | Koberlein | 8/4 |
| 2,739,080 | 3/1956 | Woodworth | 8/4 |
| 2,879,740 | 3/1959 | Mahon | 427/231 |
| 2,914,373 | 11/1959 | Rieser | 8/4 |
| 2,971,860 | 2/1961 | Fitzgerald | 118/56 |
| 3,072,969 | 1/1963 | Du Bois | 264/92 |
| 3,441,361 | 4/1969 | Tocatlian | 8/4 |
| 3,463,844 | 8/1969 | Griffin | 264/89 |
| 3,467,059 | 9/1969 | Korner | 427/240 |
| 3,555,704 | 1/1971 | Schrumpf et al. | 35/42.5 |
| 3,653,941 | 4/1972 | Bell | 427/72 |
| 3,726,953 | 4/1973 | Jones | 264/92 |
| 3,762,083 | 10/1973 | Lemons et al. | 353/62 |

Primary Examiner—Ralph S. Kendall
Assistant Examiner—John D. Smith
Attorney, Agent, or Firm—William W. Rundle; Willard M. Graham

[57] ABSTRACT

A method and apparatus utilized in forming a hemispherical shape from a cast thermoplastic acrylic resin sheet or the like, dyeing the inside surface of the hemisphere to provide a uniform color density or a color density variation increasing from light to dark from the horizon to the zenith point of the hemisphere, heating the hemisphere to its forming temperature, causing it to revert to a flat sheet, and reverse forming the hemisphere to have the dyed surface on the outside.

18 Claims, 7 Drawing Figures

U.S. Patent  Oct. 4, 1977  Sheet 3 of 3  4,052,494

TRANSPARENCY FABRICATION METHOD

BACKGROUND OF THE INVENTION

Earth-sky projectors are used in simulators to provide a realistic visual representation of the environment, including the earth and sky. The projectors are normally servo controlled by computer inputs to rotate the visual scenes as required to duplicate the motion of a simulated vehicle. In sky projectors the light source is normally a mercury arc lamp, and in earth projectors the light source is normally a tungsten halogen lamp. In either case the light is projected through a dyed transparent hemispherical dome, to a screen. The prior art hemispherical domes are made of glass or of an acrylic plastic material and are dyed by spraying the inside, and in some cases the outside, or by dipping the outside surface in a dye vat and slowly removing it to provide color density variation increasing from light to dark from the horizon to the zenith point of the hemisphere. The color density variation achieved by spraying or dipping is not uniform and therefore is not adequate for today's sophisticated simulators. Further, when the dyed surface is the inside surface of the dome the surface will craze and the dye will fade rapidly when subjected to ultraviolet rays emitted from mercury arc lamps. However, we have discovered that cast thermoplastic acrylic has excellent ultraviolet absorbing characteristics and that the usable life of simulator hemispherical domes can be extended by approximately a factor of eight when made of acrylic plastic and the dyed surface is the outside surface of the hemispherical dome.

BRIEF SUMMARY OF INVENTION

This invention relates to dyed transparent curved shapes and more particularly to dyed hemispherical transparencies utilized on simulator projectors that provide realistic visual representations of the earth, sky and combinations thereof.

The use of transparent domes for use on earth-sky projectors is in itself not new in the art. However, prior to the present invention no method was available which would provide a uniform color density to the inside or outside surface of a hemispherical shape.

In this invention, transparencies are fabricated from cast thermoplastic acrylic sheet, which are vacuum formed to hemispherical shapes and uniformly dyed. Clouds are usually painted on the inside surface of the sky transparency with a rubber substance (such as rubber cement) prior to the dyeing of the inside surface. After dyeing, the rubber substance is removed leaving a clear surface which projects as a cloud on a white screen. Accordingly it is an object of this invention to provide the method and apparatus for dyeing the inside surface of a hemispherical shape to provide a uniform color density variation increasing from light to dark from the horizon to the zenith point of the hemisphere. Another object is to provide a method and apparatus for dyeing the inside surface of a hemispherical shape to provide a uniform color density to the entire inside surface of the hemisphere.

Another object is to provide a method of reversing a hemispherical shape having the dyed surface on the inside to a hemispherical shape having the dyed surface on the outside thereby extending its useful life when used on a mercury arc light projector.

Although the characteristic features of the present invention are particularly pointed out in the appended claims, the invention itself and its method of fabrication will be better understood by referring to the following description taken in connection with the accompanying drawings forming a part of this application.

Figure 1:
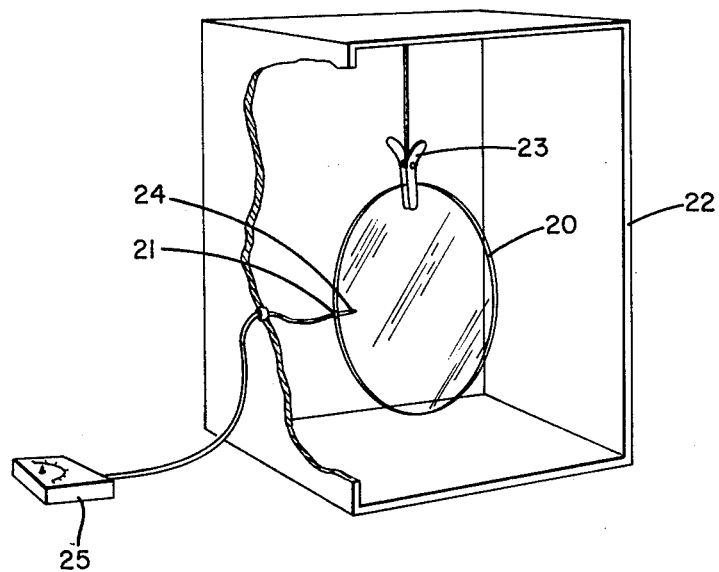
FIG. 1 is a front perspective view, partly cut away, of a temperature controlled oven with the workpiece held therein.

Referring more specfically to FIG. 1, a workpiece 20 is cut into a substantially circular shape and provided with a hole 21 drilled in the periphery of the workpiece 20. The workpiece 20 is suspended in a temperature controlled oven 22 by a spring clamp 23. A temperature sensor 24 is removably inserted into the hole 21 and connected to a temperature recording device 25. The temperature controlled oven 22 should be of a type that assures the entire workpiece 20 will be heated uniformly. While we have illustrated the workpiece 20 as being heated in an oven, other types of heating such as infrared, oil, etc., may be employed provided the workpiece 20 is heated uniformly and its optical properties are maintained.

Figure 2:
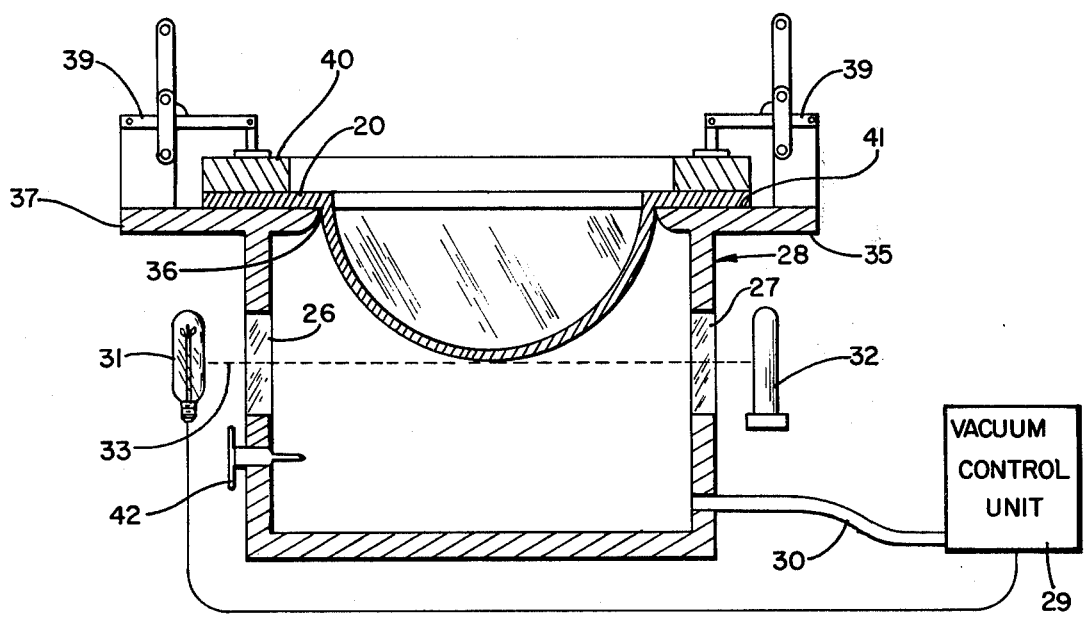
FIG. 2 is a side elevation view, partly in cross section, of the vacuum forming apparatus showing the workpiece in its formed configuration.

In FIG. 2 the workpiece 20 is shown in its formed hemispherical shape inside a vacuum chamber 28. The vaccum chamber 28 is attached to a vacuum control unit 29 through a vacuum line 30; vacuum pressure inside the vacuum chamber 28 is controlled by the vacuum control unit 29 during the vacuum forming operation by a beam of light 33 from a light source 31 passing through two vacuum chambers windows 26 and 27, respectively, and focusing on a photoelectric cell 32. Changes in current in the photoelectric cell 32 maintain the proper vacuum by means of the vacuum control unit 29, thereby assuring that a correct draw depth is established and maintained during cooling of the workpiece 20. The vacuum chamber 28 is provided with a circular flange 35, and the inside diameter 36 of the circular flange 35 controls the outside hemispherical diameter of the workpiece 20. The outside diameter of the circular flange 35 extends beyond the outside diameter of the vacuum chamber 28 and forms a clamp support base 37. A plurality of toggle clamps 39 are welded to the clamp support base 37 and releasably secure to a clamp ring 40 to the workpiece 20 maintaining it in a vacuum tight relationship with a holding surface 41 during vacuum forming. A temperature gage 42 extends into vacuum chamber 28 and provides a continuous indicator of the chamber 28 air temperature. Other methods of forming such as pressure forming, stretch forming, hot die forming, etc., can be substituted for vacuum forming provided the surfaces of the workpiece 20 are not marred during the forming operation.

Figure 3:
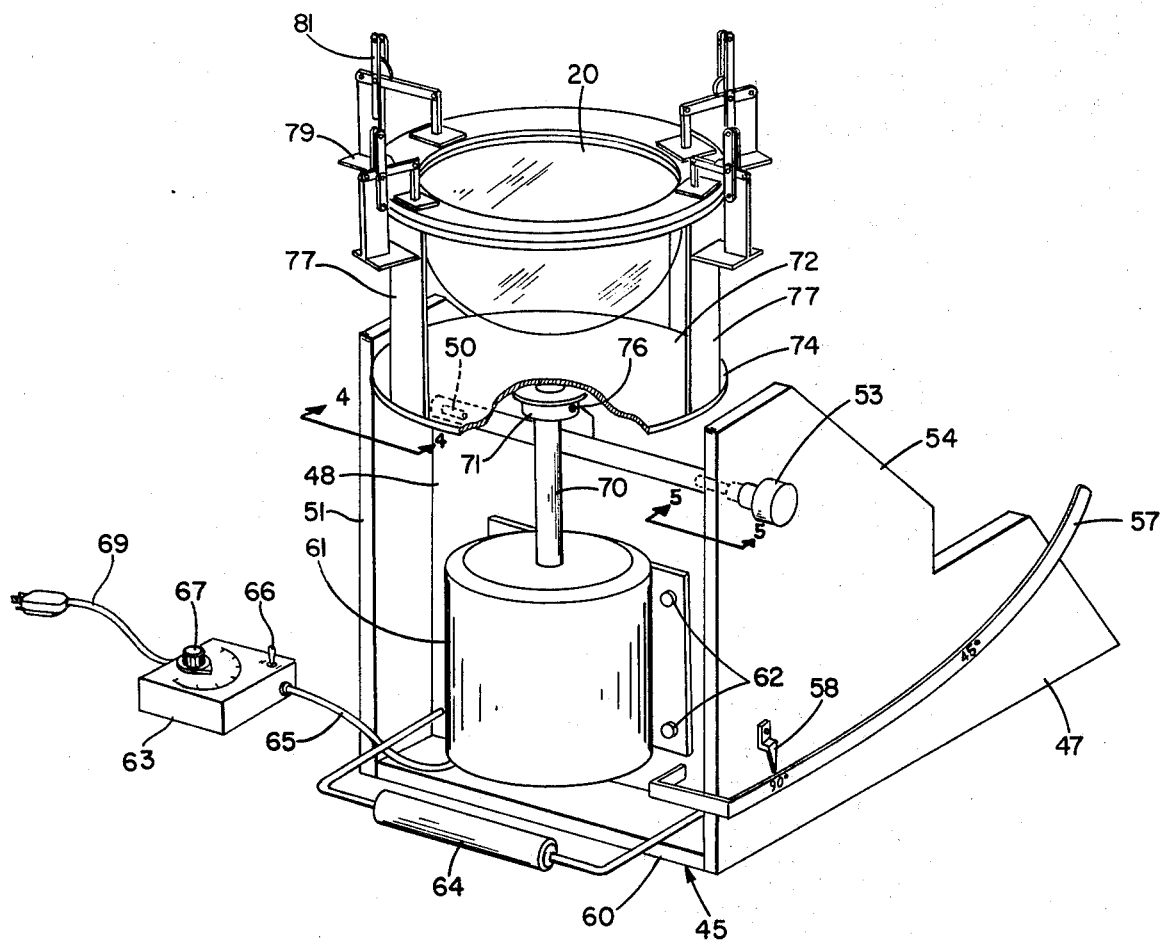
FIG. 3 is a perspective view, partly in cross section, of the rotatable cage and drive apparatus employed in dyeing the inside surface of the formed workpiece.
Figure 5:
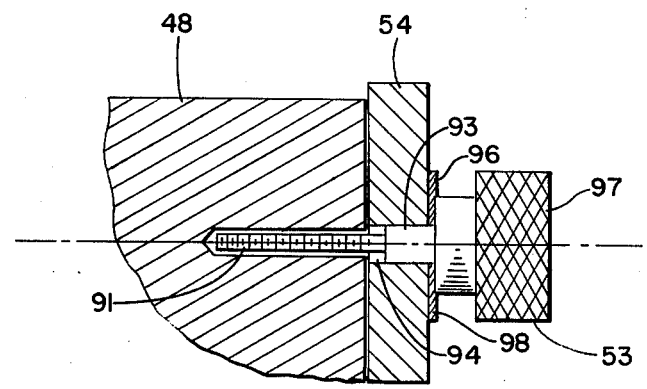
FIG. 5 is an enlarged fragmentary front elevation view, partly in cross section, illustrating the locking pivot shown in FIG. 3.
Figure 4:
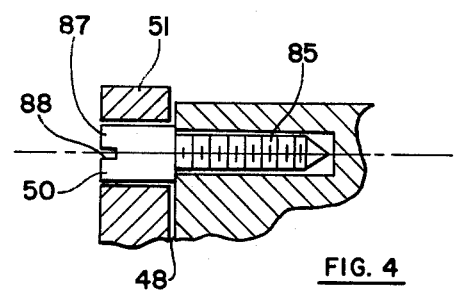
FIG. 4 is an enlarged fragmentary front elevation view, partly in cross section, illustrating one of the pivots shown in FIG. 3.

In FIG. 3 we have illustrated a rotatable cage drive apparatus 45 which comprises a generally "U" shaped support bracket 47 of welded construction, having a first leg 51 and a second leg 54. The support bracket 47 pivotally supports a motor plate 48 by a first pivot 50 threadably secured into the motor support plate 48 and freely rotatable in the first leg 51 (details of first pivot 50 are shown in FIG. 4) and a locking pivot 53 releasably threaded into the motor plate 48 and freely rotatable in the second leg 54 of "U" shaped support bracket 47 when in a released condition and configured to lock the motor support plate 48 at any angle from 0° to 90° about its pivotal axes when in a tightened position (details of locking pivot 53 are shown in FIG. 5). A degree indicator sector 57 is welded to the motor support plate 48 and by means of an indicator mark 58 located on second leg 54 displays the angle of motor support plate 48 relative to the plane of a base 60 of the support bracket 47. A handle 64 is welded to the motor support plate 48 for the purpose of tilting the motor support plate 48 to its required angle prior to locking it into position by means of the locking pivot 53.

A drive motor 61 is bolted to the motor support plate 48 by bolts 62 which are threadably received in the motor support plate 48. The drive motor 61 is connected to a drive motor control unit 63 by a motor cable 65, and the drive motor control unit 63 is equipped with an ON-OFF switch 66 and a motor speed control selector 67 which controls the rotational speed of the drive motor 61. The drive motor control unit 63 is connected to a power source (not shown) through a control unit power cable 69. A drive shaft 70 extends from the drive motor 61 and removably receives a flange 71 of a cage assembly 72. The cage assembly 72 is of welded construction and comprises a circular lower base plate 74 and a cage ring 75 attached above the circular base plate 74 by means of four perpendicular legs 77 spaced equally around the periphery of the circular base plate 74 and the cage ring 75, maintaining them in a parallel spaced relationship. The flange 71 is welded to the bottom of the base plate 74 on the central axis thereof and is removably held to the drive shaft 70 by a set screw 76. A toggle clamp bracket 79 is welded near the upper end of each perpendicular leg 77 and a toggle clamp 81 is in turn welded to each toggle bracket 79 at a location whereby they provide a means for holding the workpiece 20 to the cage ring 75 when in a closed position and allow the removal of workpiece 20 when in an open position.

FIG. 4 shows the first pivot 50 as having a threaded end 85, a shoulder 86, a pivot surface 87, rotatable in the first leg 51, and a screwdriver slot 88 for inserting the first pivot 50 into the motor support plate 48. The shoulder 86 locks the first pivot into motor support plate 48 by friction established between the shoulder 86 and the motor support plate 48 when the first pivot 50 is tightened.

In FIG. 5 we have illustrated the locking pivot 53 as having a threaded stud 91 received in the motor support plate 48, a bearing surface 93 which is rotatable in the second leg 54, a restraining shoulder 96, a knob 97 and a flat washer 98 interposed between the restraining shoulder 96 and the second leg 54. When the knob 97 is rotated in one given direction the threaded stud 91 pulls the motor support plate 48 into friction engagement with the second leg 54 thereby locking the motor support plate 48 at any desired angle. The flat washer 98 acts as a bearing surface for the restraining shoulder 96 and prevents galling between the second leg 54 and the restraining shoulder 96 as the knob 97 is turned to the tightened position. When the knob 97 is rotated in the other given direction, to a release position, the motor support plate 48 is free to rotate about the bearing surface 93 and pivot the surface 87 shown in FIG. 4.

Figure 6:
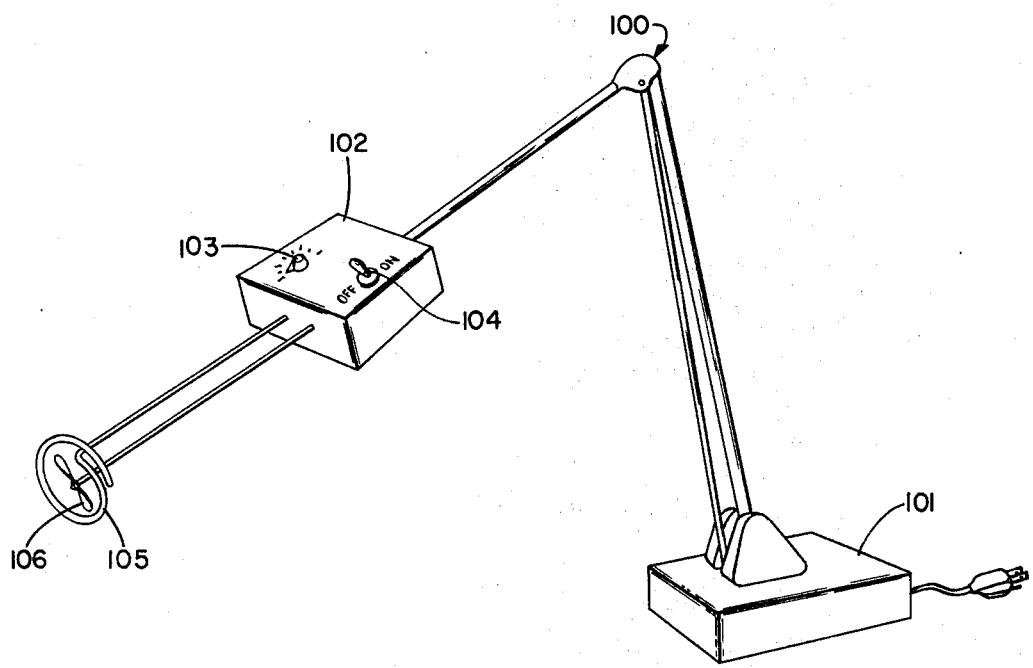
FIG. 6 is a front perspective view of the heater/mixer and stand assembly employed in dyeing the inside surface of the workpiece.

In FIG. 6 we have shown the type of heater/mixer and stand assembly 100 employed in the dyeing operation of the workpiece 20. A stand 101 is a modified fluorescent drafting board or desk lamp, the only modification being the removal of the fluorescent tubes and holding assembly, and its replacement by a standard heater and mixer unit 102. The heater and mixer unit has a separate heater control 103 for an electric heating element 105 and a mixer ON-OFF switch 104 for controlling a mixer fan 106.

Figure 7:
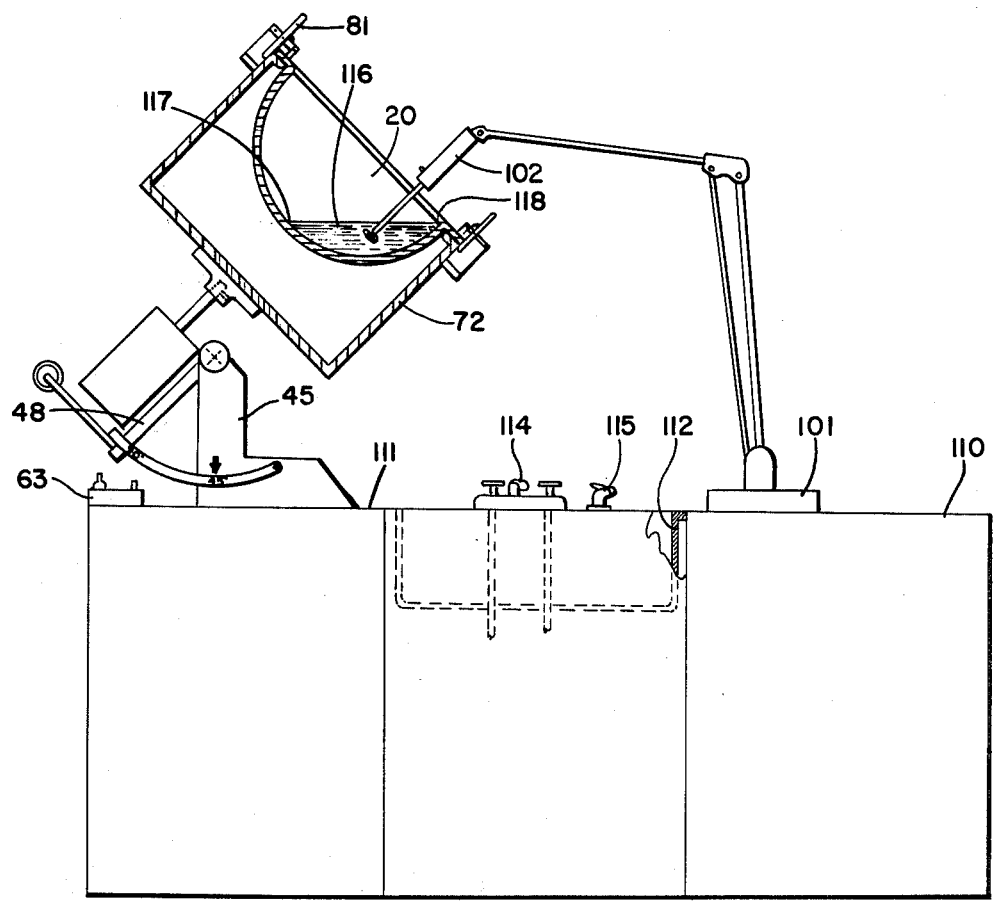
FIG. 7 is a front elevation view, partly in cross section, illustrating one configuration and arrangement of equipment employed in hot dyeing of the workpiece.

FIG. 7 illustrates one configuration and arrangement of equipment used for hot dyeing of the workpiece 20. The rotatable cage and drive apparatus 45, the drive motor control unit 63 and the stand 101 are shown on a cabinet 110, the cabinet 110 is of standard configuration having a level top surface 111, a sink 112 and a water faucet 114 which includes an extendable washer unit 115. The workpiece 20 is held in the cage assembly 72 by the toggle clamps 81, and the motor support plate 48 is oriented and locked at 45° relative to the level top surface 111. The workpiece 20 holds a dye solution 116.

The heater 105 and fan 106 are inserted in the dye 116 in the workpiece 20. As can be visualized, when the workpiece 20 is rotated about its central axis, an inside zenith point 117 is in the dye 100% of the time per revolution and all points on an inside horizon line 118 are in the dye 116 proportionally less time per revolution, resulting in a variable color density starting at the inside horizon 118 and increasing to the inside zenith 117 of workpiece 20.

There are two basic types of dye used in practicing the present invention. They are hot acrylic dye which is absorbed into the surface of the workpiece 20, and room temperature acrylic dye which dissolves the surface of the workpiece 20 as it blends with it.

It has been found that when the workpiece is to be reformed after dyeing, it is preferred that the dye be adsorbed into the surface of the workpiece 20. This absorption assures that the dye will contract and expand without cracking or flaking.

MODE OF OPERATION OF INVENTION

Acrylic resin sheets are shipped from the manufacturer protected by a tough paper coated with pressure sensitive adhesive to prevent scratching during handling and fabrication. This paper (not shown) should not be removed until the workpiece 20 is cut therefrom and the hole 21 drilled into the periphery of the workpiece 20. After the workpiece 20 is cut to a circular configuration and the hole 21 drilled as shown in FIG. 1, the workpiece should be cleaned with isopropyl alcohol, or equivalent, to remove any residue which might remain on the workpiece 20. (It is understood that the circular configuration of workpiece 20 is only for the convenience of handling.) In heating the workpiece to its forming temperature, the temperature controlled oven 22 should be preheated to about 10° F above the forming temperature of the workpiece 20, the workpiece 20 then be suspended in the oven by the spring clamp 23 and the temperature sensor 24 inserted into the hole 21. The oven door (not shown) is then closed. When the temperature recording device 25 shows that the workpiece 20 is heated to at least 10° F above its minimum forming temperature, the oven door is opened and the temperature sensor 24 removed. The workpiece 20 is then transferred while hot to the vacuum chamber 28 (FIG. 2), the clamp ring 40 placed on the work piece 20 and the toggle clamps 39 are closed to establish a vacuum tight relationship with the holding surface 41. The vacuum control unit 29 is then activated and automatically establishes the correct draw depth of the workpiece 20 and maintains it during cooling thereof. After the workpiece 20 has cooled to a stable point below its forming temperature, as indicated by temperature gage 42, it is removed and placed in the rotatable cage and drive apparatus 45 and is held in position by the toggle clamps 81, as shown in FIG. 3.

The reason the work piece 20 is heated to a point above its minimum ductile or forming temperature, in the above described process, is to create a soft workable material for forming, and eliminate the need of temperature controlling the vacuum chamber 28 during the forming operation.

A. Uniform Density - Hot Dye

Depending upon the color density requirement and the type dye being used, the following procedures are used:

When the inside surface of the workpiece 20 is to be uniformly dyed, with hot dye, the dye is preheated to the temperature recommended by the manufacturer, and the motor support plate 48 is locked at 90° elevation by means of locking pivot 53, with the workpiece 20 installed. The drive motor 61 is then turned on by the motor ON-OFF switch 66 and set to rotate at approximately 5 RPM by means of the motor speed control selector 67. The hot dye 116 is then poured into the workpiece 20 (which is preferably at room temperature) totally filling it, the heater and mixer unit 102 is then positioned with the heater 105 and mixer fan 106 submerged in the dye. The heater is then set to the temperature recommended by the dye manufacturer by means of heater control 103 and the mixer switch 104 is placed to the ON position. The time the dye remains in the workpiece 20 determines the final color density; after the desired color density is reached the heater 105 is turned off by means of the heater control 103 and the mixer switch 104 is placed to the OFF position. The heater and mixer unit is then removed from the dye, the locking pivot 53 is untightened and the motor plate 48 positioned to 0°, dumping the dye into the sink 112 (FIG. 7). The motor plate 48 is then locked at the 0° degree position and the workpiece 20 is rinsed with water supplied from the extendable washer unit 115 located on cabinet unit 110 to remove all dye except that which has been absorbed into the surface of the workpiece 20. The drive motor speed may be increased by the motor speed control selector 67 to accelerate air drying of the workpiece 20. After the workpiece is dry, the drive motor 61 is turned off by motor ON-OFF switch 66 and the workpiece 20 is removed from the rotatable cage and drive apparatus 45. If it is not to be reverse formed it is trimmed to its final hemispherical shape and is ready for usage. If its intended usage is to project an earth scene, transparent landscape may be added by decal or transparent paint.

The purpose of rotating the workpiece 20 while at the same time agitating the dye is to assure that no eddy currents are established relative to any point in the workpiece 20 for any given period of time. This method of dyeing assures a uniform color density over the entire inside surface of the workpiece 20.

B. Uniform Color Density - Room Temperature Dye

When the inside surface of the workpiece 20 is to be uniformly dyed with room temperature dye, the motor support plate 48 is locked at 90° elevation by means of locking pivot 53, the workpiece 20 placed in the rotatable cage and drive apparatus 45 and held in position by the toggle clamps 81. The drive motor 61 is then turned on by the ON-OFF switch 66 and set to rotate at approximately 5 RPM by means of the motor speed selector 67. Room temperature dye is then poured into workpiece 20 totally filling it and the heater and mixer unit 102 positioned so that the heater 105 and fan 106 are submerged in the dye and the mixer switch 104 is placed to the ON position. The heater section 105 of the heater and mixer unit 102 is not utilized in room temperature dyeing, however, it is an integral part of the unit 102 as shown in FIG. 6 and is not deleted, since it is not detrimental to the function of the mixer. Obviously a mixer without an integrated heater could be utilized in room temperature dyeing. The time the dye remains in the workpiece 20 determines the color density; after the desired color density is reached the mixer switch 104 is set at OFF and the heater and mixer unit removed from the dye. The locking pivot 53 is then untightened and the motor plate 48 positioned to 0°, dumping the dye into the sink 112. When the dye not blended with the surface of the workpiece 20 has been poured in the sink 112 and is drained from the workpiece 20 the drive motor 61 is turned off by ON-OFF switch 66 and the workpiece 20 is removed from the rotatable cage and drive apparatus 45. In using room temperature dye the workpiece 20 need not be rinsed.

C. Variable Color Density - Hot Dye

When the inside surface is to be dyed with hot dye, to provide a color density variation increasing from light to dark from the inside horizon 118 to the inside zenith point 117 of the workpiece 20 (FIG. 7), the workpiece 20 is placed in the rotatable cage and drive apparatus 45 and held in position by the toggle clamps 81, the dye is heated to the temperature recommended, and the motor support plate 48 is locked at 45° elevation by means of locking pivot 53. The drive motor 61 is then turned on by switch 66 and set to rotate at approximately 60 RPM by means of the motor speed control selector 67. The hot dye is then poured into the workpiece 20 filling it to a point where it overflows the inside horizon 118. The heater and mixer unit 102 is then positioned so that the heater 105 and fan 106 are submerged in the dye. The heater is then set to the temperature recommended by the dye manufacturer by means of heater control 103 and the mixer switch 104 is placed to the ON position. When the desired color density is reached the heater is turned off by means of the heater control 103 and the mixer switch 104 is placed to the OFF position. The heater and mixer 102 is then removed from the dye, the drive motor 61 is reduced to approximately 5 RPM by means of the motor speed control selector 67, the locking pivot 53 untightened and the motor plate 48 positioned to 0°, dumping the dye into the sink 112. The motor plate 48 is then locked at the 0° position and the workpiece 20 rinsed with water. After rinsing, the drive motor 61 is turned OFF by switch 66 and the workpiece removed from the rotatable cage and drive apparatus 45. The workpiece 20 may then either be trimmed or reverse formed depending on its intended end usage.

D. Variable Color Density - Room Temperature Dye

When the inside surface is to be dyed with room temperature dye, to provide a color density variation increasing from light to dark from the inside horizon 118 to the inside zenith point 117 of the workpiece 20, the workpiece 20 is placed in the rotatable cage and drive apparatus 45 and held in position by the toggle clamps 81. The motor support plate 48 is locked at 45° elevation by means of locking pivot 53, the drive motor 61 turned on by switch 66 and set to rotate at approximately 10 RPM by means of the motor speed control selector 67. The room temperature dye is then poured into the workpiece 20 filling it to a point where it overflows the inside horizon 118, the heater 105 and fan 106 are submerged in the dye and the mixer switch 104 is placed to the ON position. When the desired color density is reached, the mixer switch 104 is placed to the OFF position, and the heater mixer unit 102 removed from the dye, the drive motor 61 speed is reduced to approximately 5 RPM by means of the motor control selector 67, the locking pivot 53 untightened and the motor plate 48 positioned to 0°, dumping the dye not blended with the surface of the workpiece 20 into the sink 112. The drive motor 61 is then turned off by ON-OFF switch 66 and the workpiece 20 removed from the rotatable cage and drive apparatus 45.

Now that the workpiece 20 has been formed and its inside hemispherical surface dyed, it is desired to reverse-form it to position the dyed surface on the outside of the workpiece 20. To do this, the workpiece 20 is again suspended in the preheated temperature oven 22 by means of spring clamp 23. The temperature sensor 24 is inserted into the hole 21 of the workpiece 20 and the oven door (not shown) closed. As the workpiece 20 approaches its forming temperature it starts to revert to a flat sheet and by the time it reaches its forming temperature it has reverted to a flat sheet. When the sheet has again been heated to about 10° F above its minimum forming temperature, the temperature sensor 24 is removed and the workpiece 20 transferred to the vacuum chamber 28 and positioned so that in reverse forming, the dyed surface will be the outside surface of the workpiece 20. The clamp ring 40 is placed on the workpiece 20 and the toggle clamps 39 are closed to establish a vacuum tight relationship with the holding surface 41. The vacuum control unit 29 is then activated and automatically establishes the correct draw depth and maintains it during cooling of the workpiece 20. After the workpiece 20 has cooled to a desired point below its forming temperature, it is removed from the vacuum chamber 28 and trimmed to provide a hemispherical shape dome adapted for usage on a simulator projector.

We have described only a typical form of the invention as employed for simulator usage. However, we do not wish to be limited to the specific shape herein set forth, or the type of dye used but wish to reserve to ourselves any variation in shape or types of dye that appears to those skilled in the art and fall within the scope of the following claims.

We claim:
1. The process of uniformly dyeing the inside surface of a substantially hemispherically shaped transparent article for end use in a simulator visual display projection system or the like in which light is projected through said article to a screen, comprising:
   a. positioning said article concave side up with the extremities thereof level whereby the concavity can be completely filled with a dye solution;
   b. rotating said article about a central vertical axis;
   c. completely filling said article with said dye solution;
   d. mixing said dye solution while said article is rotating; and
   e. pouring said dye solution from said article when the desired color density is achieved.
2. Process in accordance with claim 1 including:
   a. heating said dye solution prior to filling said article; and
   b. maintaining said dye solution heated while mixing to the desired color density.
3. The process for uniformly dyeing the inside surface of a substantially hemispherically shaped transparent part for end use in a simulator visual display projector system or the like, comprising:
   a. positioning said part concave side up in a rotatable cage and drive apparatus, the extremities of said part being in a level orientation whereby the part can be completely filled with a dye solution;
   b. rotating said cage assembly about a central axis perpendicular to a level plane;
   c. filling said part with said dye solution;
   d. inserting a mixer means into said dye solution;
   e. energizing said mixer means;
   f. removing said mixer means when the desired color density of said part is achieved;
   g. pouring said dye solution from said part;
   h. stopping the rotation of said rotatable cage; and
   i. removing said part from said rotatable cage.
4. Process in accordance with claim 3 including:
   a. heating said dye solution prior to filling said part;
   b. inserting a heater unit into said dye solution along with said mixer means;
   c. energizing said heater unit to maintain the temperature of said dye solution;
   d. removing said heater unit along with said mixer means; and
   e. rinsing said part with water after pouring said dye solution from said part.
5. Process in accordance with claim 3 including partly painting said inside surface of said part with a rubber substance prior to the dyeing of said part, and removing said rubber substance after dyeing of said part, leaving an undyed section on said inside surface of said part.
6. The process of dyeing the inside surface of a transparent substantially hemispherically shaped article to provide a uniform color density variation increasing from relatively light at the horizon to relatively dark at the zenith point of said article, said article having an end use in a simulator visual display projection system or the like, comprising:
   a. positioning said article generally concave side up with a line extending from a horizon point to the zenith point being on a horizontal level, thereby making the central axis of said article through said zenith point positioned at a 45° inclination;
   b. rotating said article about said central axis;
   c. filling said article with dye solution to a point where said dye solution just overflows the lower horizon point of said article;
   d. mixing said dye solution while said article is rotating; and e. pouring said dye solution from said article when the dye has stained said surface of said article to provide the desired color density.

7. Process in accordance with claim 6 including:
a. heating said dye solution prior to filling said article; and
b. maintaining said dye solution heated while mixing to the desired color density.

8. The process for dyeing the inside surface of a transparent substantially hemispherically shaped part to provide a uniform color density variation increasing from light to dark from the horizon to the zenith point of said part, said part having an end use in a simulator projection system or the like, comprising:
a. positioning a rotatable cage and drive apparatus to an inclined plane of 45°;
b. installing said part into said rotatable cage assembly;
c. rotating said rotatable cage about its central axis;
d. filling said part with dye to a point where said dye overflows the inside horizon of said part;
e. inserting a mixer means into said dye solution;
f. energizing said mixer means;
g. removing said mixer means when the dye has stained said surface of said article to provide the desired color density of said part;
h. pouring said dye solution from said part;
i. stopping the rotation of said rotatable cage; and
j. removing said part from said rotatable cage.

9. Process in accordance with claim 8 including:
a. heating said dye solution prior to filling said part;
b. inserting a heater unit into said dye solution along with said mixer means;
c. energizing said heater unit to maintain the temperature of said dye solution;
d. removing said heater unit along with said mixer means, and rinsing said part with water after pouring said dye solution from said part.

10. Process in accordance with claim 9 including partly painting said inside surface of said part with a rubber substance prior to the dyeing of said part, and removing said rubber substance after dyeing of said part, leaving an undyed section on said inside surface of said part.

11. The process of forming a curved transparent article dyed on the outside convex surface, comprising:
a. heating a transparent sheet until it becomes ductile;
b. vacuum forming, by means of differential pressure, and sheet to form a transparent article having a first concave side;
c. cooling said transparent article to room temperature;
d. dyeing said first concave side;
e. reheating said transparent article until it becomes ductile; and
f. reverse forming, by means of differential pressure, said transparent article to thereby change said dyed first concave side to the final dyed outside convex surface.

12. The process of claim 11 wherein said dyeing includes holding a liquid dye solution in said first concave side until the desired color density is achieved.

13. Process in accordance with claim 11 wherein said article comprises a thermoplastic resin.

14. The process of forming a curved transparent article dyed on the outside convex surface, comprising:
a. heating a flat transparent article to about 10° F. above its minimum ductile temperature;
b. forming said article to a curved shape by means of a differential pressure;
c. cooling said article until it is rigid;
d. dyeing the inside, concave, surface of said article;
e. reheating said article to about 10° F. above its minimum ductile temperature; and
f. reverse forming, by differential pressure, said article such that the dyed surface is on the final convex side.

15. The process of forming a transparent substantially hemispherically shaped article dyed on the outside surface, comprising:
a. heating a flat sheet of clear thermoplastic resin to its ductile temperature;
b. forming said sheet, by means of a differential pressure, into a substantially hemispherically shaped part;
c. cooling said hemispherically shaped part, at room temperature, unit it becomes rigid;
d. dyeing the inside surface of said hemispherically shaped part;
e. reheating said hemispherically shaped part to its ductile temperature; and
f. reverse forming said substantially hemispherically shaped part to form a substantially opposite hemispherical shape wherein the former inside dyed surface becomes the final outside surface of said substantially hemispherically shaped article.

16. The process in accordance with claim 15 wherein said dyeing comprises:
a. rotating said substantially hemispherically shaped part about an axis extending through the zenith point and the center of the hemisphere, with the inside hemisphere surface generally up, said axis being inclined at 45° to the vertical;
b. filling said hemisphere with a dye solution to the point where said solution just overflows the lower horizon point of said hemisphere and continuing the rotation until the desired color density is achieved, and then emptying said hemisphere of said solution;
c. whereby said hemisphere is given a uniformly varying color density increasing from relatively light at the horizon to relatively dark at the zenith point.

17. Process in accordance with claim 15 wherein said dyeing comprises:
a. positioning said substantially hemispherically shaped part such that the axis extending through the zenith point and the center of the hemisphere is vertical, with the inside hemisphere surface up;
b. filling said hemisphere completely with a dye solution and letting it remain until the desired color density is achieved, and then emptying said hemisphere of said solution;
c. whereby said hemisphere is given a uniform color density at all points of its dyed surface.

18. The process of forming a curved transparent part dyed on the outside convex surface of the part, comprising:
a. placing a transparent part in a heating means;
b. heating said part to its ductile temperature;
c. removing said part from said heating means while at its ductile temperature;
d. positioning said part in a forming means;
e. forming said part by means of a differential pressure;
f. cooling each part at room temperature, until it becomes rigid;

g. removing the formed part from said forming means;

h. dyeing the inside concave surface of said formed part;

i. placing said formed part in said heating means;

j. reheating said formed part to its ductile temperature;

k. removing said part from said heating means while at its ductile temperature;

l. positioning said part in said forming means in an orientation such that after reverse forming, the dyed surface will be said outside convex surface of said part;

m. reverse forming said part by means of a differential pressure;

n. cooling said part, at room temperature, until it becomes rigid; and o. removing the reformed part from said forming means.

* * * * *